UNITED STATES PATENT OFFICE.

SIMON DE JAGER, OF DENVER, COLORADO.

EMULSION.

SPECIFICATION forming part of Letters Patent No. 472,925, dated April 12, 1892.

Application filed May 19, 1891. Serial No. 393,348. (No specimens.)

*To all whom it may concern:*

Be it known that I, SIMON DE JAGER, a native of Holland, having declared my intention to become a citizen of the United States of America, residing at Denver, in the county of Arapahoe and State of Colorado, have invented a new and useful Composition of Matter to be Used as a Medicine; and I do declare the following to be a full, clear, and exact description of the invention, such as will enable others skilled in the art to which it appertains to make and use the same.

My invention relates to special preparations of tannic acid (acidum tannicum) to be taken internally. It has been shown by experiment that animals fed with food in which tannic acid was mixed during about a month could be kept in a moist warm place after death during a fortnight without putrefaction. The tissues of the body had become impregnated to a certain extent with the tannic acid, so that no microbes could develop in them. Encouraged by these experiments rabbits were fed with tannic acid and inoculated afterward with bacilli of tuberculosis and found exempt from this infection. Subsequent to these experiments tuberculosis patients were treated with tannic acid with encouraging results. Since the publication of these experiments I have treated a number of tuberculosis patients with tannic acid internally and I am quite satisfied with the results. In a number of cases, however, I met with a great obstacle. The tannic acid has to be given in pretty large doses and can only be taken directly after meals. If tannic acid gets into an empty stomach, it is sure to disturb the digestion considerably, and even in many cases the patients could not by any possibility retain the tannic acid in their stomachs, so that this treatment had to be stopped on this account. Therefore it has been my endeavor to find a preparation of tannic acid which would not possess these disadvantages. As is well-known, gelatine and tannic acid form a chemical compound. This chemical compound is considered so much insoluble that we find gelatine enumerated as one of the incompatibles with tannic acid. Yet this "tannin-gelatine," as I will call it, is not so insoluble after all. If a solution of tannic acid in water is poured into a solution of gelatine in water, this tannin-gelatine is formed as a tough sticky substance. If all the water is evaporated, the dry substance can be ground to a powder. If this powder is taken in the mouth and chewed, the tough sticky substance is formed again, and, eaten very slowly, it dissolves gradually. That some of this really dissolves is proved by the traces of gallic acid in the urine. This tannin-gelatine dissolves, however, very easily in hot water to which some drops of hydrochloric or acetic acid are added. The solution is perfectly clear, and when it is cooled off it changes into a fluid which resembles in appearance most closely the ordinary milk. I will call this fluid an "emulsion." The same emulsion can be prepared by boiling gelatine and water, adding a few drops of hydrochloric acid, acetic acid, or any other acid, and then pouring a solution of tannic acid and water gradually into it while the fluid is constantly stirred. After cooling off the emulsion is formed. This emulsion tastes a little acid, but does not possess anything of the detestable taste of tannic acid. Microscopically examined the emulsion proves, also, to have somewhat of the microscopical appearance of milk. We find little spherical objects of different sizes or about the same size as the spherical fat bodies of milk. Adding a drop of chloride of iron to the fluid under the cover-glass the presence of tannic acid is proved, as the spherical bodies become bluish-black.

The emulsion taken internally does not produce any of the disturbing symptoms which the tannic acid produces. It is taken easily, and the urine soon gives proof that it has been absorbed.

It is not quite necessary to use an acid in order to get an emulsion of tannic acid. If a solution of gelatine in water is boiled and a solution of tannic acid in water is carefully poured into it under very strong stirring, we get a similar emulsion, which possesses the same qualities as the one prepared with an acid. Only when this emulsion stands quietly for some time a deposit at the bottom of the bottle is formed much easier than when prepared with acid. This deposit can be prevented from being formed by using some more gelatine, so that the whole fluid becomes gelatinous after cooling off. The same kind of gelatinous mass can be prepared from the emulsion prepared with an acid.

All the emulsions are apt to become moldy if they stand for some time exposed to the air or if the bottle in which they are kept is not well closed. It is therefore necessary to pour the emulsion in a perfectly-clean bottle while it is still hot, sterilize bottle and fluid together, and close the bottle hermetically. One part of tannic acid, in weight, requires about two parts of gelatine, in weight, to make a constant emulsion. The strength of the emulsion can be made as required by adding more or less water with or without gelatine.

The acid required to form an excellent emulsion never exceeds a quantity which can be given internally without any harm, while it is of course understood that a harmless acid—such as hydrochloric acid or acetic acid—is used. For instance, fifteen grams (four drams) of tannic acid and thirty grams (one ounce) of gelatine in one liter (three pints) of water requires only ten or fifteen drops of hydrochloric acid to give a perfect emulsion. If a solution of tannic acid in water is poured into a boiling solution of gelatine in water to which some drops of acid are added, one can gradually add a little more acid till the whole fluid is perfectly clear. If this fluid is evaporated, a dry stuff remains behind, which, after grinding, gives a yellowish-white powder. This powder dissolves easily in hot water, and gives, after cooling off, a similar emulsion, as described above. Even if this powder is shaken with cold water an emulsion can be obtained, though not so perfect as when it has been first dissolved in hot water. If the powder is taken into the mouth and chewed, it dissolves gradually and more quickly than when no acid has been used. Taking some saliva when this powder is chewed and adding a drop of chloride of iron the tannic acid in the saliva is easily tested in great quantity, though nothing of it can be tasted.

It seems to me that under the influence of the acid the gelatine is changed into gelatine-pepton and that tannic acid forms a union with the gelatine-pepton. This would explain the solubility of the powder. Though this is only a supposition, I will call this powder "tannin-gelatine pepton," or shortly "tannin-pepton."

All these preparations of tannic acid can be given internally where tannic acid is required, the quantity of tannic acid in the preparation being the basis of the strength of the preparation. These have the same good qualities as the tannic acid itself, but miss all the bad qualities. Therefore I do not believe it necessary to enumerate the diseases in which they can be used. Of course some corrigent may be added to the preparations to give them an agreeable taste or appearance; but, whatever corrigent or other medicine may be added to them or whatever diseases may be benefited by them,

What I claim is—

The herein-described preparation of tannic acid and gelatine, (to be used as a medicine in the form of a solution or emulsion,) in combination with a suitable acid to prevent precipitation, as set forth.

In testimony whereof I affix my signature in presence of two witnesses.

SIMON DE JAGER.

Witnesses
 Wm. McConnell,
 Louis E. P. Wilkes.